United States Patent [19]

Taniishi et al.

[11] Patent Number: 5,726,686
[45] Date of Patent: Mar. 10, 1998

[54] COORDINATES INPUT APPARATUS

[75] Inventors: Shinnosuke Taniishi, Tokyo; Yuichiro Yoshimura; Kiyoshi Kaneko, both of Yokohama; Atsushi Tanaka, Kawasaki; Katsuyuki Kobayashi, Tokyo; Shigeki Mori, Tokyo; Noriyuki Suzuki, Tokyo, all of Japan

[73] Assignee: Canon Kabushiki Kaisha, Tokyo, Japan

[21] Appl. No.: 131,914

[22] Filed: Oct. 4, 1993

Related U.S. Application Data

[63] Continuation of Ser. No. 817,963, Jan. 8, 1992, abandoned, which is a continuation of Ser. No. 259,801, Oct. 19, 1988, abandoned.

[30] Foreign Application Priority Data

Oct. 28, 1987 [JP] Japan ................................. 62-273963

[51] Int. Cl.⁶ ................................................ G09G 5/00
[52] U.S. Cl. ................................... 345/179; 178/18
[58] Field of Search ...................... 178/18, 19; 345/158, 345/174, 179

[56] References Cited

U.S. PATENT DOCUMENTS

| | | | |
|---|---|---|---|
| 4,139,576 | 2/1979 | Yoshimura et al. | 525/189 |
| 4,647,771 | 3/1987 | Kato | 348/710 |
| 4,697,244 | 9/1987 | Marakami et al. | 340/706 |
| 4,853,494 | 8/1989 | Suzuki | 178/18 |
| 4,853,496 | 8/1989 | Taniishi | 78/18 |
| 4,931,965 | 6/1990 | Kaneko et al. | 178/18 |

FOREIGN PATENT DOCUMENTS

| | | | |
|---|---|---|---|
| 0107992 | 9/1984 | European Pat. Off. | |
| 2575281 | 6/1986 | France | |
| 2154734 | 9/1985 | United Kingdom | 340/710 |

*Primary Examiner*—Regina Liang
*Attorney, Agent, or Firm*—Fitzpatrick, Cella, Harper & Scinto

[57] ABSTRACT

There is provided a coordinates input apparatus in which a vibration input from a vibration pen having a piezoelectric transducer is detected by a plurality of vibration sensors attached to a vibration propagating plates such as an input tablet and the coordinates of this pen on the plate are detected. The tip of the vibration input pen is made of a material of a resin of the polyamideimide system such as thermoplastic polyamideimide or aromatic polyamideimide. With this material, a desired image can be smoothly input to the input tablet without scratching the glass surface thereof and the accurate coordinates can be detected.

3 Claims, 6 Drawing Sheets

COORDINATES INPUT APPARATUS

This application is a continuation-in-part of application Ser. No. 07/817,963 filed Jan. 8, 1992, now abandoned, which is a continuation of application Ser. No. 07/259,801 filed Oct. 19, 1988, abandoned.

BACKGROUND OF THE INVENTION

1. Field of the Invention

The present invention relates to a coordinates input apparatus and, more particularly, to a coordinates input apparatus in which a vibration input from a vibration pen is detected by a plurality of sensors attached to a vibration propagating plate and coordinates of the vibration pen on the vibration propagating plate are detected.

2. Related Background Art

Hitherto, as an apparatus for inputting hand-written characters, figures, or the like to a processing apparatus such as a computer, various kinds of coordinates input apparatuses using input pen, tablet, and the like have been known. In such a kind of apparatuses, image data consisting of input characters, figures, etc. is output to a display apparatus such as a CRT display or a recording apparatus such as a printer.

The following various kinds of systems are known as a system to detect the coordinates on a tablet of this kind of apparatus.

1) A system in which a change in resistance value of a sheet material arranged so as to face a resistive film is detected.

2) A system in which the electromagnetic or electrostatic induction of a conductive sheet or the like which is arranged so as to face the tablet is detected.

3) A system in which the ultrasonic vibration which is propagated from an input pen to the tablet is detected.

In the foregoing systems 1) and 2), it is difficult to form a transparent tablet since a resistive film or conductive film is used. On the other hand, in the system 3), since the tablet can be made of a transparent material such as acrylic plate, glass plate, or the like, it is possible to construct a coordinates input apparatus in which the input table is arranged so as to overlap a liquid crystal display device or the like and this apparatus can be used with such a feeling that an image is written on a paper and a good operating feeling is derived. In this case, a material such as aluminum having a good vibration propagating efficiency is generally used as a material of the tip of a vibration input pen to input an ultrasonic vibration onto the vibration propagating plate such as acrylic plate, glass plate, or the like.

However, if aluminum is used as the material of the tip of the pen, although the vibration propagating efficiency is good, the vibration propagating plate made of acrylic plate, glass plate, or metal plate such as an aluminum plate which is used when transparency is not needed will be scratched, or the pen tip itself made of aluminum will be abraded.

When the vibration propagating plate itself is scratched, it cannot be used as goods because of a bad outside appearance. On the other hand, there is a problem such that when the pen tip is abraded, the function as a vibration horn is lost and the detection waveform is disturbed, so that the coordinates cannot be detected at a high accuracy.

SUMMARY OF THE INVENTION

It is an object of the present invention to provide a coordinates input apparatus of a high accuracy in which a vibration input from a vibration pen having vibration generating means is detected by a plurality of sensors attached to a vibration propagating plate and the coordinates of the vibration pen on the vibration propagating plate are detected, wherein by using a resin as a material of the tip of the vibration pen, the scratching on the vibration propagating plate is completely eliminated and the abrasion resistance of the resin is high, so that not only the life of the pen tip itself is remarkably prolonged but also the writing feeling can be improved and the stable detection waveform can be obtained even when the pen is inclined.

DETAILED DESCRIPTION OF THE EMBODIMENT

Figure 1:
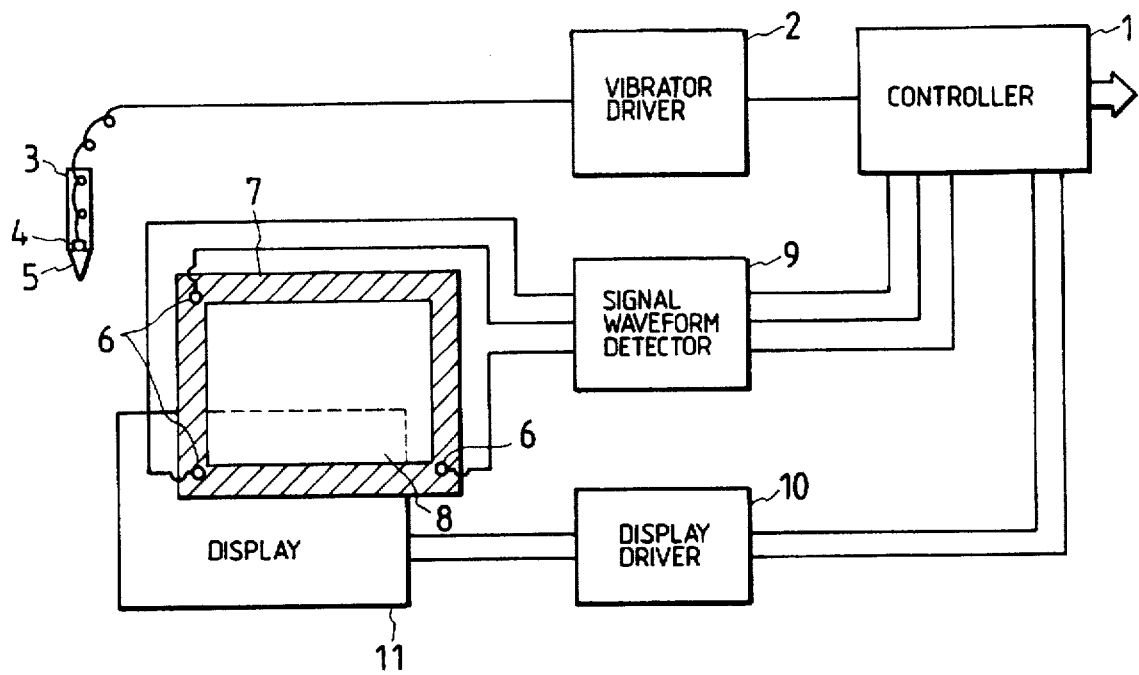
FIG. 1 is a diagram showing an arrangement of a coordinates input apparatus using the present invention.

The present invention will be described in detail hereinbelow on the basis of an embodiment shown in the drawings.

FIG. 1 shows a structure of a coordinates input apparatus using the present invention. In the coordinates input apparatus of FIG. 1, coordinates are input by a vibration pen 3 onto an input tablet consisting of a vibration propagating plate 8 and in accordance with the input coordinates information, an input image is displayed on a display 11 consisting of a CRT arranged so as to be overlaid on the input tablet.

In the diagram, a vibration propagating plate 8 is made of acrylic plate, glass plate, or the like and propagates the vibration which is input from the vibration pen 3 to three vibration sensors 6 attached to the upper surface in the corner portions of this plate. In this embodiment, the coordinates of the vibration pen 3 on the vibration propagating plate 8 are detected by measuring a propagating time of the ultrasonic vibration propagated from the vibration pen 3 to each vibration sensor 6 through the vibration propagating plate 8.

The peripheral portion of the vibration propagating plate 8 is supported by a reflection preventing material 7 made of silicon rubber or the like in order to prevent that the vibration propagated from the vibration pen 3 is reflected by the peripheral portion and returned to the central portion.

The vibration propagating plate 8 is arranged on the display 11 such as a CRT (or LCD) which can display an image by dots and can dot display the image at the position which was traced by the vibration pen 3. That is, the dots of the input image are displayed at the position on the display 11 corresponding to the detected coordinates of the vibration pen 3. The image consisting of elements such as points or lines which were input by the vibration pen 3 appears after the locus of the vibration pen as if it were written on a paper by the hand.

On the other hand, according to such a structure in the display 11, it is also possible to use an input system in which a menu is displayed and a desired item on this menu is selected by the vibration pen, or a prompt is displayed and the vibration pen 3 is touched to a predetermined position, or the like.

The vibration pen 3 to propagate the ultrasonic vibration to the vibration propagating plate 8 has therein a vibrator 4 consisting of a piezoelectric transducer or the like. The ultrasonic vibration generated by the vibrator 4 is propagated to the vibration propagating plate 8 through a horn portion 5 having a pointed tip.

Figure 2:
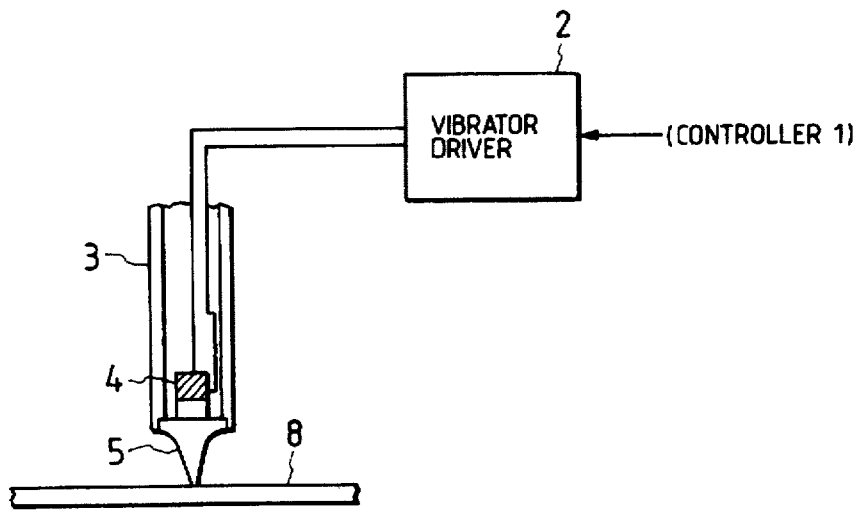
FIG. 2 is a diagram showing a structure of a vibration pen in FIG. 1.

FIG. 2 shows a structure of the vibration pen 3. The vibrator 4 assembled in the vibration pen 3 is driven by a vibrator driver 2. A drive signal of the vibrator 4 is supplied as a low level pulse signal from a controller 1 in FIG. 1. This signal is amplified at a predetermined gain by the vibrator driver 2 which can be driven at a low impedance and, thereafter, it is applied to the vibrator 4.

The electrical drive signal is converted into the mechanical ultrasonic vibration by the vibrator 4 and propagated to the vibration propagating plate 8 through the horn portion 5.

A vibrating frequency of the vibrator 4 is set to such a value that a plate wave also known as a Lamb wave can be generated from the vibration propagating plate 8 such as acrylic plate, glass plate, or the like. The characteristics of Lamb waves are described in greater detail at pages 63–89 of Volume 2 of "ACOUSTIC FIELDS AND WAVES IN SOLIDS" by B. A. Auld, published by John Wiley & Sons, 1973. When the vibrator is driven, a vibrating mode such that the vibrator 4 mainly vibrates in the vertical direction in FIG. 2 for the vibration propagating plate 8 is selected. On the other hand, the vibration conversion can be efficiently performed by setting the vibrating frequency of the vibrator 4 to the resonant frequency of the vibrator 4.

The elastic wave which is propagated to the vibration propagating plate 8 as mentioned above is the plate or Lamb wave and has an advantage such that it is hardly influenced by a scratch, obstacle, or the like on the surface of the vibration propagating plate 8 as compared with the surface wave or the like.

Returning to FIG. 1, each of the vibration sensors 6 attached to the corner portions of the vibration propagating plates 8 is also constructed by a mechanical/electrical converting device such as a piezoelectric transducer or the like. An output signal of each of the three vibration sensors 6 is input to a signal waveform detector 9 and converted into a detection signal which can be processed by the controller 1 at the post stage. The controller measures the vibration propagating time and detects the coordinates of the position of the vibration pen 3 on the plate 8.

The detected coordinates information of the pen 3 is processed by the controller 1 in accordance with the output system by the display 11. That is, the controller 1 controls the output operation of the display 11 through a display driver 10 on the basis of the input coordinates information.

Figure 3:
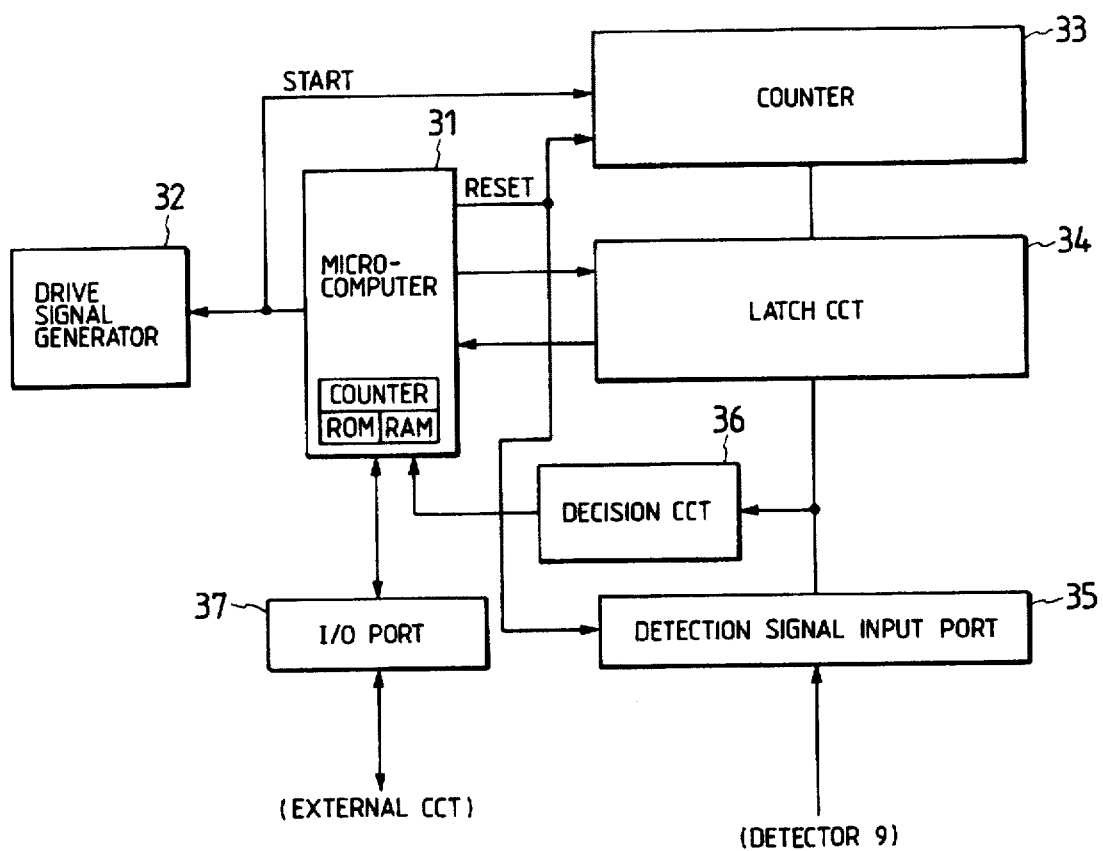
FIG. 3 is a block diagram showing an arrangement of a controller in FIG. 1.

FIG. 3 shows an arrangement of the controller 1 in FIG. 1. FIG. 3 mainly shows an arrangement of the drive system of the vibration pen 3 and the vibration detecting system by the vibrartion sensors 6.

A micro-computer 31 has therein an internal counter, a ROM, and a RAM. A drive signal generator 32 generates drive pulses of a predetermined frequency to the vibrator driver 2 in FIG. 1 and is activated synchronously with a circuit to perform arithmetic operations of the coordinates by the micro-computer 31.

A count value of a counter 33 is latched to a latch circuit 34 by the micro-computer 31.

On the other hand, the signal waveform detector 9 outputs timing information of the detection signal to measure the vibration propagating time for detection of the coordinates and signal level information to detect the writing pressure on the basis of the outputs of the vibration sensors 6 as will be explained hereinafter. These timing and level information are respectively input to an input port 35.

The timing signal generated from the signal waveform detector 9 is input to the input port 35 and compared with a count value in the latch circuit 34 by a decision circuit 36. The result of the comparison is input to the micro-computer 31. That is, the vibration propagating time is expressed as a latch value of the output data of the counter 33. The coordinates are calculated on the basis of the vibration propagating time value.

The output control process of the display 11 is executed through an input/output (I/O) port 37.

Figure 4:
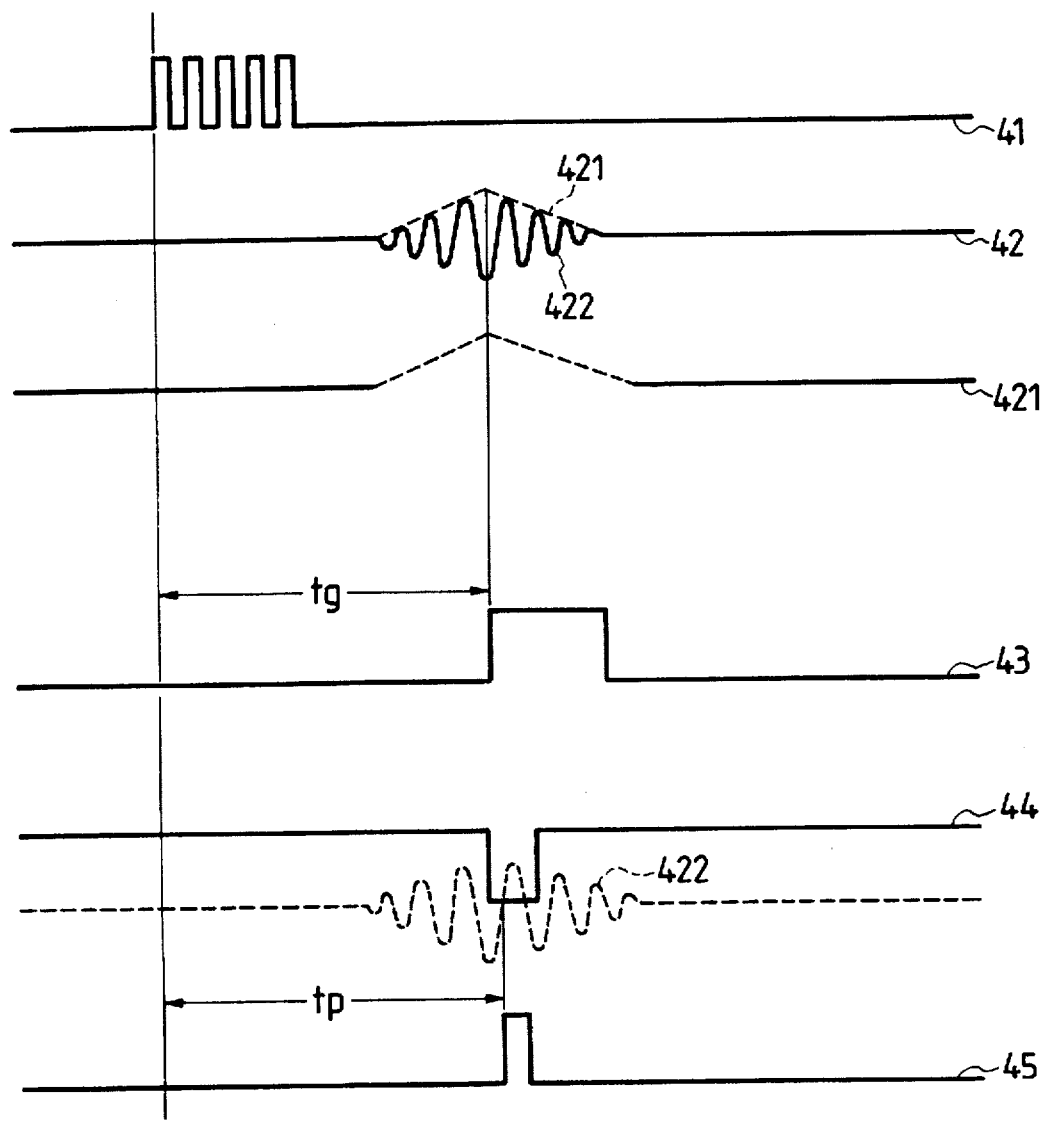
FIG. 4 is a waveform diagram showing a detection waveform for explaining the measurement of the distance between the vibration pen and the vibration sensor.

FIG. 4 is a diagram for explain a waveform of a detection signal which is input to the signal waveform detector 9 in FIG. 1 and the process to measure the vibration propagating time on the basis of this waveform. In FIG. 4, a drive signal pulse 41 is applied to the vibration pen 3. The ultrasonic vibration propagated to the vibration propagating plate 8 from the vibration pen 3 which had been driven by such a waveform passes through the inside of the vibration propagating plate 8 and is detected by the vibration sensors 6.

After the vibration progressed in the plate 8 for a period of time $t_g$ corresponding to the distance to the vibration sensor 6, the vibration reaches the sensor 6. Reference numeral 42 in FIG. 4 denotes a signal waveform detected by the sensor 6. Since the dispersive wave is used as the plate wave in the embodiment, the relation between an envelope 421 and a phase 422 of the detection waveform for the propagation distance in the vibration propagating plate 8 changes in accordance with the propagating distance during the propagation of the vibration.

A group velocity of the envelope assumes $v_g$ and a phase velocity assumes $v_p$. The distance between the pen 3 and the sensor 6 can be detected from the difference between the group velocity and the phase velocity.

When an attention is first paid to only the envelope 421, the velocity is $v_g$. When a point on a special waveform, for instance, the peak is detected as shown at reference numeral 43 in FIG. 4, a distance d between the pen 3 and the sensor 6 can be obtained by $$d = v_g \cdot t_g \qquad (1)$$

where, $t_g$ is a vibration propagating time.

Although this equation relates to one of the vibration sensors 6, the distance between each of the other two vibration sensors 6 and the vibration pen 3 can be calculated by the same equation.

Further, to determine the coordinates values at a higher accuracy, the process based on the detection of a phase signal is executed. Assuming that a period of time from a special detection point of the phase waveform 422 in FIG. 4, e.g., from the timing when the vibration is applied to the zero cross point after the passing of the peak point is $t_p$, the distance between the sensor and the pen can be calculated by $$d = n \cdot \lambda_p + v_p \cdot t_p \tag{2}$$

where, $\lambda_p$ is a waveform of the elastic wave and n is an integer.

From the above equations (1) and (2), the integer n is obtained by $$n = [(v_g \cdot t_g - v_p \cdot t_p)/\lambda_{p+1}/] \tag{3}$$

N is a real number other than 0 and is set to a proper numerical value. For instance, when N=2, if the wavelength lies within a range of ±½ wavelength, n can be determined.

By substituting the value of n derived in this manner to the equation (2), the distance between the pen 3 and the sensor 6 can be accurately measured.

Figure 5:
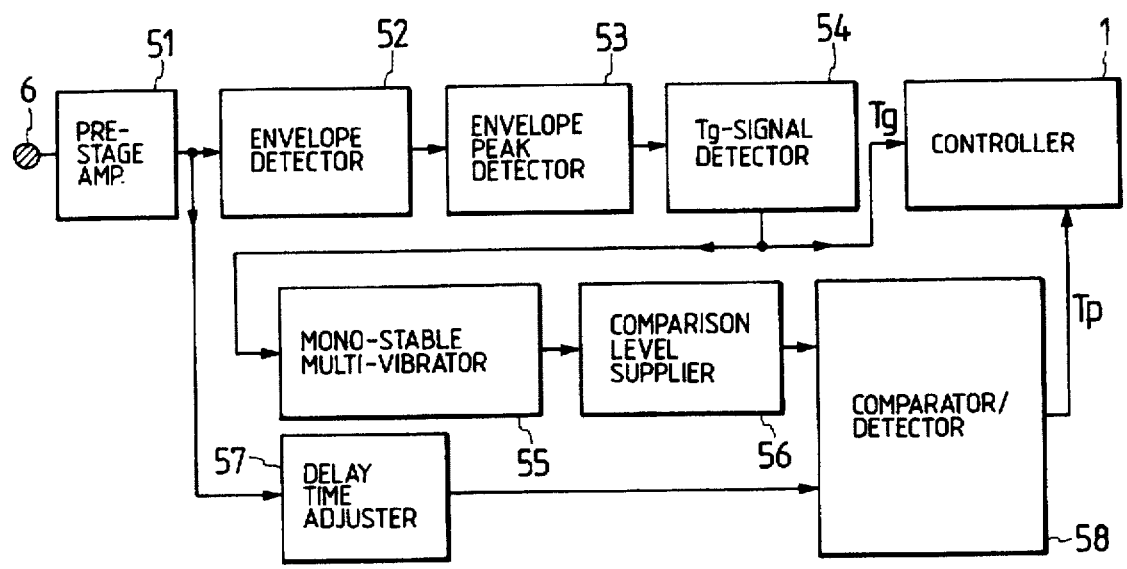
FIG. 5 is a block diagram showing an arrangement of a waveform detecting circuit in FIG. 1.

The two vibration propagating times $t_g$ and $t_p$ shown in FIG. 4 are measured by the signal waveform detector 9 in FIG. 1. The signal waveform detector 9 is constructed as shown in FIG. 5. To detect the writing pressure, the signal waveform detector in FIG. 5 also processes the level information of the output waveform of the vibration sensor 6 as will be explained hereinafter.

In FIG. 5, the output signal of the sensor 6 is amplified to a predetermined level by a pre-stage amplifier 51. The amplified signal is input to an envelope detector 52 and only the envelope of the detection signal is extracted. The timing of the peak of the envelope extracted is detected by an envelope peak detector 53. An envelope delay time detection signal $T_g$ of a predetermined waveform is formed from the peak detection signal by a $T_g$-signal detector 54 consisting of a monostable multivibrator (not shown) or the like and input to the controller 1.

On the other hand, a phase delay time detection signal Tp is formed by a comparator/detector 58 from both of the $T_g$ signal and the original signal delayed by a delay time adjuster 57. As indicated in waveforms 44 and 422 of FIG. 4, a monostable multivibrator 55 generates a negative signal responsive to the leading edge of the signal Tg from Tg signal detector 54. The negative signal from the multivibrator 55 causes a comparison level detector 56 to provide a predetermined level signal at one input of the comparator/detector 58. The $T_p$ signal is input to the controller 1.

The above-mentioned circuit relates to one of the three vibration sensors 6 and the same circuit is also provided for each of the other sensors. Now, assuming that the number of sensors is set to a general value of h, the h detection signals of the envelope delay times $T_{g1}$ to $T_{gh}$ and h detection signals of the phase delay times $T_{p1}$ to $T_{ph}$ are input to the controller 1, respectively.

The controller 1 in FIG. 3 receives the signals $T_{g1}$ to $T_{gh}$ and the signals $T_{p1}$ to $T_{ph}$ from the input port 35 and takes the count value of the counter 33 to the latch circuit 34 by using each timing as a trigger. Since the counter 33 is made operative synchronously with the driving of the vibration pen as mentioned above, the data indicative of the delay time of each of the envelope and phase are fetched to the latch circuit 34.

Figure 6:
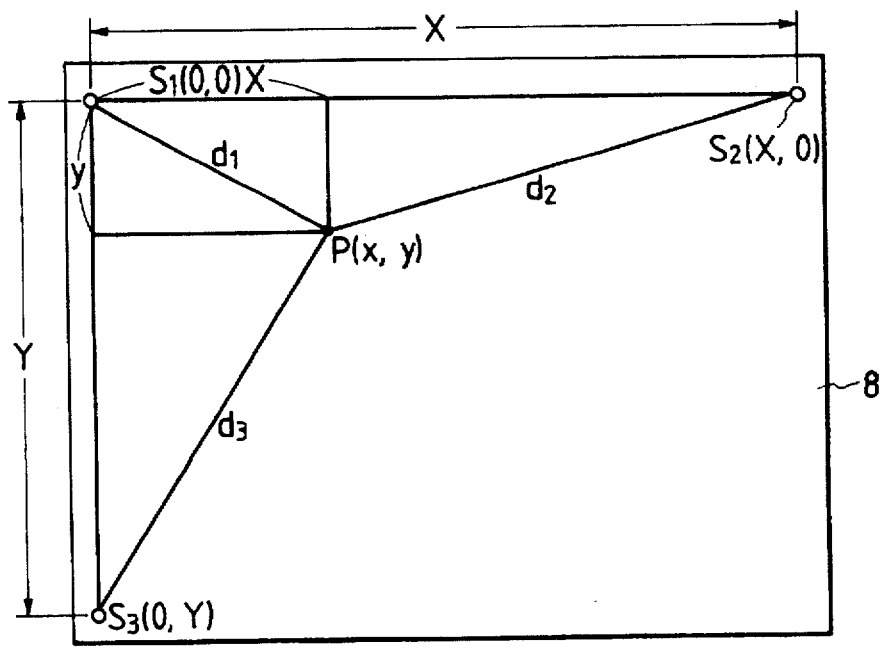
FIG. 6 is an explanatory diagram showing an arrangement of a vibration sensor.

As shown in FIG. 6, when three vibration sensors 6 are arranged at three corner positions $S_1$ to $S_3$ on the vibration propagating plate 8, straight line distances $d_1$ to $d_3$ from a position P of the vibration pen 3 to the positions of the sensors 6 can be obtained by the processes which have already been described in FIG. 4. Further, the coordinates (x, y) of the position P of the pen 3 can be derived by the controller 1 on the basis of the straight line distances $d_1$ to $d_3$ by the theorem of three squares from the following equations.

$$x = X/2 + (d_1 + d_2)(d_1 - d_2)/2X \tag{4}$$

$$y = Y/2 + (d_1 + d_3)(d_1 - d_3)/2Y \tag{5}$$

where, X and Y denote distances along the X and Y axes between the sensors 6 attached to the positions $S_2$ and $S_3$ and the sensor attached to the origin (position $S_1$.

In this manner, the coordinates of the position of the vibration pen 3 can be detected in a realtime manner.

According to the foregoing construction, since the ultrasonic vibration is propagated as the plate or Lamb wave of the elastic wave to the vibration propagating plate 8, the interference by a scratch and obstacle on the vibration propagating plate 8 can be reduced and the coordinates can be detected at a high accuracy.

Comparison and examination to determine the material of the horn portion 5 will now be described hereinbelow.

Figure 9:
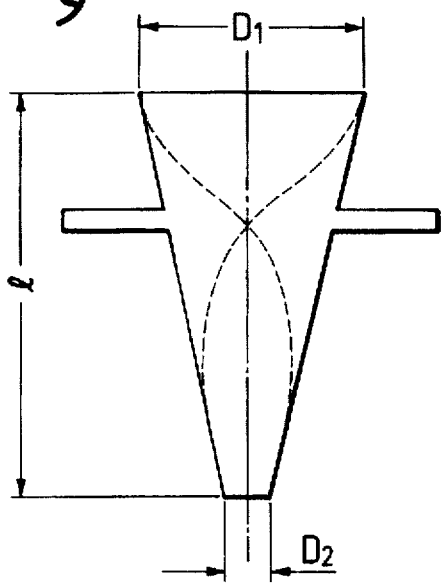
FIG. 9 is a diagram showing a shape of a half-wave length resonant horn.

In general, the horn has an advantage such that the vibration of the vibrator is enhanced. This horn is designed in accordance with the following resonant conditional equation so as to have a shape as illustrated in FIG. 9 (equation 6).

$$\tan \alpha_l = \frac{\omega \lambda_c (D_1 - D_2)^2}{C^2 (D_1 - D_2)^2 + \omega^2 l^2 D_1 D_2} \tag{6}$$

where, a resonant angular frequency of the horn is $\omega$ (=2πf), a sound velocity in the material of the horn is c, and a wavelength constant is $\alpha$(=ω/c).

Therefore, to obtain the efficient amplification at the front edge of the horn, it is necessary to keep the horn shape. On the other hand, even in the case where coordinates are input, the surface of the glass as a propagating material must not be scratched. Therefore, the following conditions are required as a material of the pen tip in which the horn is assembled.

1) The vibration of the vibrator can be propagated to the propagating material.

2) The abrasion resistance to the propagating material is good.

3) The propagating material is not scratched.

An explanation will now be made with respect to the tests of the material which were performed to determine the material adapted to form the horn portion which can satisfy the above conditions.

First, the examination of the material was made to see if the vibration of the vibrator can be input to a glass plate or not. Materials of aluminum, ceramics, and resin were examined in this case. The acoustic characteristics of aluminum are relatively similar to those of glass (acoustic impedance pc: pc of aluminum=$1.7 \times 10^7$, pc of glass=$1.81 \times 10^7$) and it is considered that aluminum has the good vibration propagating characteristics. Further, the material obtained by treating the surface of aluminum was also examined. In this test, alumina ceramics was used as ceramics. In general, a resin has a tendency such that the vibration is attenuated. Therefore, a hardness of resin was used as a parameter and an examination was made with regard to four kinds of polyamide, polyamideimide, polycarbonate, and polyacetal.

A method of experiment to see if the vibration of the vibrator can be input to glass or not will now be explained hereinbelow.

Horns of those materials were designed and made. The horns and piezoelectric transducer were bonded with a pressure by applying a weight of 500 g thereto. The piezoelectric transducer was driven by pulses of 400 kHz. The plate wave elastic wave propagated through the glass plate was detected by the sensors and the detection signals were output. The output signals obtained at this time were measured and the resultant amplitudes were compared.

Among those materials, the amplitude of the output detection signal waveform in the case of aluminum was the largest. On the other hand, almost the same amplitude was also derived even in the case of the material in which the surface of aluminum was treated. In the case of the material of teflon coated aluminum, the amplitude was reduced by about 10 to 15% as compared with the amplitude of aluminum. Although the amplitude of polyamideimide was only about 30% of that of aluminum, the enough amplitude was derived when specifying a detection point of the detection signal waveform. On the other hand, an amplitude of the output signal was hardly derived with respect to each of alumina ceramics, polyamide, polycarbonate, and polyacetal.

The abrasion resistance tests, will now be explained.

When the vibration of the vibrator assembled in the coordinates input pen is input to the vibration propagating material, the pen tip is abraded due to the rubbing with the propagating material. As mentioned above, in order to permanently keep the vibrating characteristics of the system of the horn and vibrator, it is unpreferable that the shape of the horn changes. That is, as a material of the pen tip, it is necessary to select such a material that the abrasion resistance to glass is high and it does not scratch the glass surface.

As a method of experiments, horns were designed and formed by three kinds of materials such as aluminum, teflon coated aluminum, and aromatic polyamideimide and the abrasion resistance tests were performed in consideration of the results of experiments mentioned above. As shown in a sine function manner were measured using the number of repetition times as a parameter. A running distance per cycle corresponds to about 2.5 characters in the case where a character "W" is written in a square of 1 cm$^2$.

Figure 8:
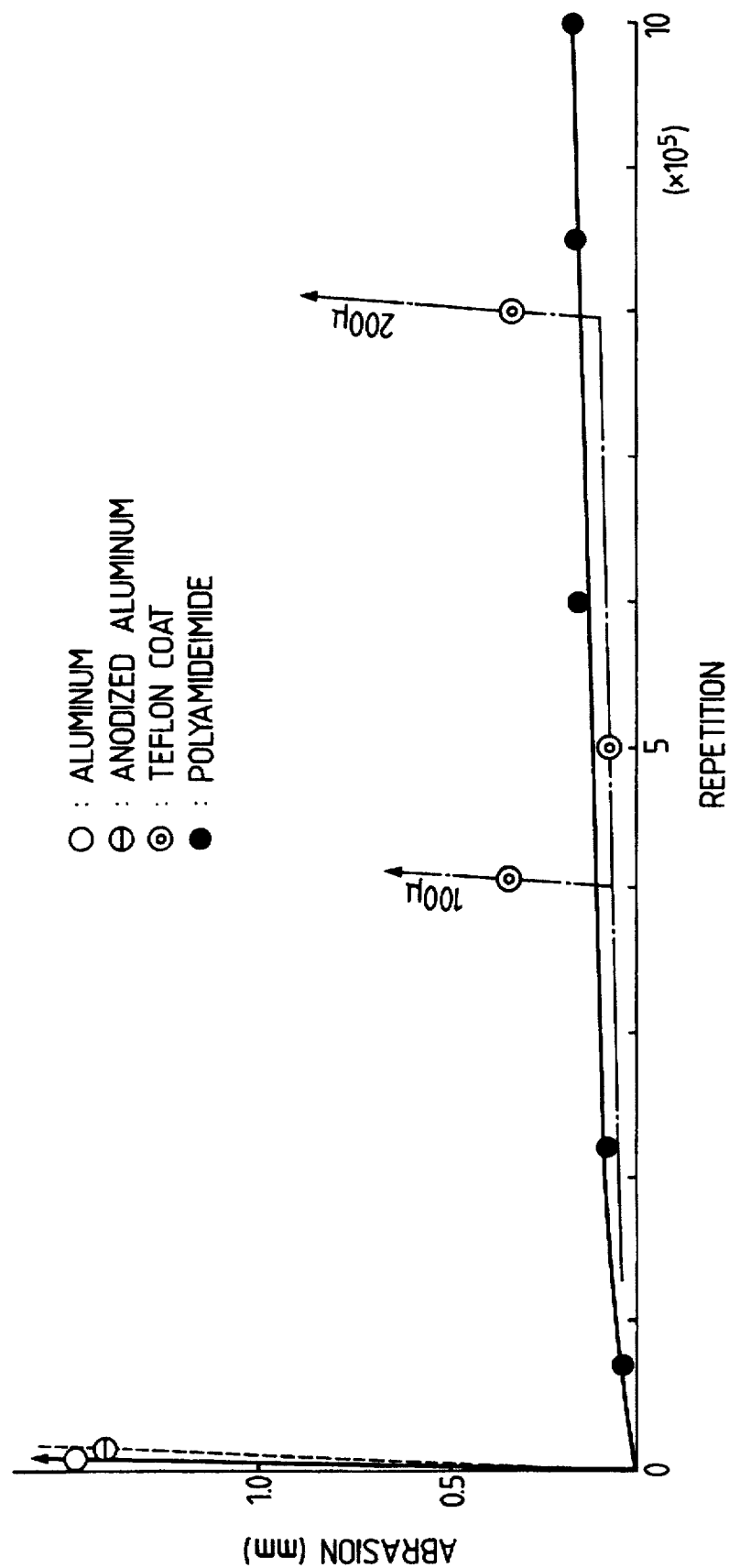
FIG. 8 is a diagram showing the result of the abrasion resistance test.

FIG. 8 shows the results of the abrasion resistance tests. The abrasion amount of aluminum was large and reached the abrasion amount of 1 mm or more by the repetition of about ten thousand times. In addition, the glass surface was scratched. Therefore, aluminum is improper as a material of the tip of the coordinates input pen of the digitizer. On the other hand, with respect to the material of anodized aluminum (alumite), although the abrasion resistance was slightly improved, it does not reach the level of the product. The abrasion resistance of teflon coated aluminum was remarkably improved. However, if the coated teflon film is broken, the abrasion amount rapidly increases. Since the teflon coating film is easily scratched or peeled off due to the rubbing or the like, when it is used as a product, the aging stability cannot be guaranteed. On the other hand, it is considered that aromatic polyamideimide has a very good characteristic in terms of the abrasion resistance for glass. Therefore, it will be appreciated that aromatic polyamideimide is a proper material which can be actually used from the results of the experiments of the vibration propagation and the results of the abrasion resistance tests. (See Table 1.)

TABLE 1

| | Comparison of materials | | | | | | |
|---|---|---|---|---|---|---|---|
| | Material | | | | | | |
| Characteristics | Aluminum | Teflon coated aluminum | Alumina ceramics | Polyamideimide | Polyamide | Polyacetal | Polycarbonate |
| Vibration propagation | O | O | X | O | X | X | X |
| Abrasion resistance | X | X | — | O | — | — | — |

In Table 1,
O: can be practically used.
X: cannot be practically used or is practically improper.

A few kinds of structural formulae of aromatic polyamideimide will now be shown below.

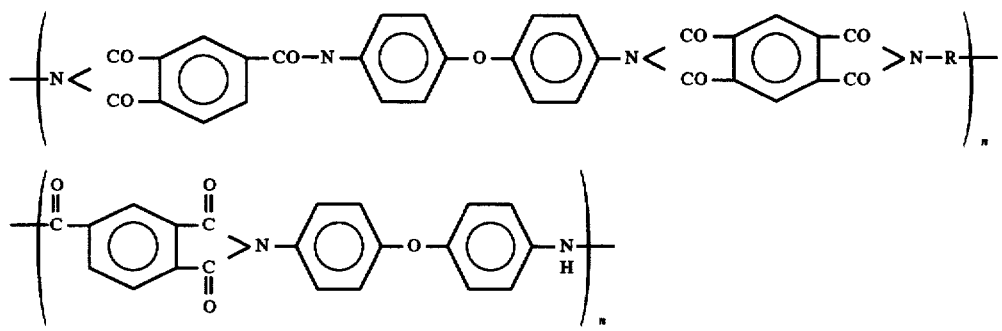

Figure 7:
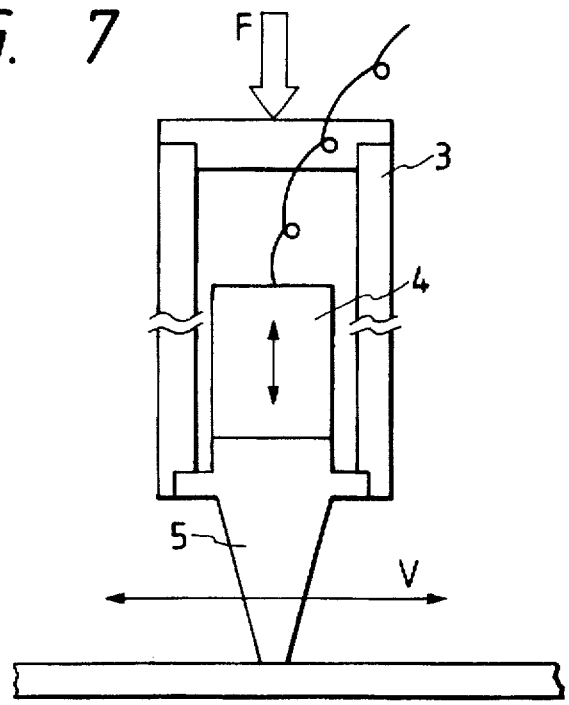
FIG. 7 is an explanatory diagram of the abrasion resistance test.

FIG. 7, a load weight F which is applied to the vibration pen 3 from the upper portion thereof was set to 200 g weight and a rubbing speed V to glass was set to an average value of 72 mm/sec. Abrasion amounts when the speed was changed in Many other various structures are considered. On the other hand, as an additive and filling material, titanium oxide, graphite, fluorocarbon resin, glass fiber, molybdenum disulfide, or the like may be also mixed.

As described above, by using aromatic polyamideimide as a material of the pen tip, the vibration can be propagated without scratching the vibration propagating plate and the reduction of the pen tip itself due to the rubbing or the like is eliminated. The stable detection signal can be permanently derived. Thus, the high accurate coordinates input apparatus can be always realized. On the other hand, the writing feeling is also extremely improved. Further, by use of aromatic polyamideimide, the pen tip can be cheaply manufactured as a product by the injection molding method or the like.

As explained above, by use of aromatic polyamideimide as a material of the pen tip, a cheap coordinates input apparatus of a high accuracy and high durability can be provided.

What is claimed is:

1. A coordinates input apparatus for detecting coordinates, on a vibration propagating plate, of a vibration input pen having vibration generating means for generating a vibration of a Lamb wave by detecting the Lamb wave vibration input from the vibration input pen and transmitted by the vibration propagating plate by a plurality of sensors attached to the vibration propagating plate, wherein the coordinates detection is executed on the basis of transmission delay times, from a position of said vibration input pen to the plurality of sensors, of a group speed and a phase speed of the Lamb wave transmitted by the vibration propagating plate, wherein a tip of said vibration input pen has a shape of a horn selected so as to be placed in resonant condition with a frequency of an ultrasonic vibration generated by the vibration generating means, and wherein said tip comprises a material which propagates an ultrasonic vibration and a resin of a polyamideimide system is used as the material to enhance vibration propagation to the vibration propagating plate and abrasion resistance against the vibration propagating plate.

2. An apparatus according to claim 1, wherein said resin is thermoplastic polyamideimide.

3. An apparatus according to claim 1, wherein said resin is aromatic polyamideimide.

* * * * *

UNITED STATES PATENT AND TRADEMARK OFFICE
CERTIFICATE OF CORRECTION

PATENT NO. : 5,726,686
DATED : March 10, 1998
INVENTOR(S) : SHINNOSUKE TANIISHI ET AL.     Page 1 of 2

It is certified that error appears in the above-identified patent and that said Letters Patent is hereby corrected as shown below:

On the title page, items:

[63] RELATED U.S. APPLICATION DATA

"Ser. No. 259,801," should read --Ser. No. 259,701,--.

[57] ABSTRACT

Line 4, "plates" should read --plate--.

COLUMN 1

Line 3, "continuation-in-part" should read --continuation--; and
Line 18, "hand-written" should read --handwritten--.

COLUMN 4

Line 27, "explain" should read --explaining--;
Line 36, "progressed" should read --progresses--;
Line 50, "an" should be deleted; and
Line 56, "$d=v_g \cdot t_g$" should read --$d=V_g \cdot t_g$--.

COLUMN 5

Line 3, "$d=n \cdot \lambda_p + v_p \cdot t_p$" should read --$d=n \cdot \lambda_p + V_p \cdot t_p$--; and
Line 9, should read --$n=[(V_g \cdot t_g - V_p \cdot t_p)/\lambda_{p+1}/N]$--.

COLUMN 6

Line 3, "a" should be deleted;
Line 4, "S3" should read --$S_3$--; and
Line 5, "(position $S_1$." should read --(position $S_1$).--.

UNITED STATES PATENT AND TRADEMARK OFFICE
CERTIFICATE OF CORRECTION

PATENT NO. : 5,726,686

DATED : March 10, 1998

INVENTOR(S) : SHINNOSUKE TANIISHI ET AL.

It is certified that error appears in the above-identified patent and that said Letters Patent is hereby corrected as shown below:

COLUMN 7

Line 5, "teflon coated" should read --teflon-coated--;
    Line 8, "the enough" should read --sufficient--;
    Line 14, "tests," should read --tests--; and
    Line 26, "teflon" should read --teflon- --.

COLUMN 8

Line 15, "teflon coated" should read --teflon-coated--; and
    Table 1, "Teflon" should read --Teflon- --.

Signed and Sealed this

First Day of December, 1998

BRUCE LEHMAN

Attest:

Attesting Officer

Commissioner of Patents and Trademarks